United States Patent Office 3,415,887
Patented Dec. 10, 1968

3,415,887
PROCESS FOR THE PREPARATION OF 4,4'-DICHLORODIPHENYL SULFONE
Michael J. Keogh, Piscataway, and Arthur K. Ingberman, Somerville, N.J., assignors to Union Carbide Corporation, a corporation of New York
No Drawing. Filed June 10, 1966, Ser. No. 556,539
5 Claims. (Cl. 260—607)

This invention relates to the preparation of 4,4'-dichlorodiphenyl sulfone.

4,4'-dichlorodiphenyl sulfone is an important monomer in the preparation of polyarylene polyethers such as those described in Belgian Patent 650,476.

To prepare 4,4'-dichlorodiphenyl sulfone, it has been proposed to react one mole of sulfur trioxide and one mole of diethyl sulfate at a temperature of from 0° C. to 10° C. to form an intermediate believed to be diethyl pyrosulfate. Thereafter two moles of chlorobenzene are added while maintaining the temperature below 10° C. and then one mole of sulfur trioxide is added and reacted to form the desired 4,4'-dichlorodiphenyl sulfone. However, this process suffers from a serious drawback in that it provides yields of only about 50 percent. Consequently this process cannot be economically employed on a commercial scale.

It has now been discovered that 4,4'-dichlorodiphenyl sulfone can be produced in commercially acceptable yields by reacting sulfur trioxide and at least about 100 percent, preferably at least about 200 percent, molar excess of diethyl sulfate at a temperature not greater than about 10° C. to form a reaction mass containing diethyl sulfate and the reaction product of sulfur trioxide and diethyl sulfate, and thereafter reacting said reaction mass with chlorobenzene and sulfur trioxide at a temperature not greater than about 15° C. and recovering 4,4'-dichlorodiphenyl sulfone. It has been unexpectedly found that the use of at least a 100 percent, and preferably at least a 200 percent molar excess of diethyl sulfate provides the critical tool whereby commercially acceptable yields of 4,4'-dichlorodiphenyl sulfone are secured. It is believed that sulfur trioxide and diethyl sulfate react to form diethyl pyrosulfate. Assuming this, the probable route of the preparation of 4,4'-dichlorodiphenyl sulfone can be shown by the following equations

1.

$$SO_3 + (C_2H_5)_2SO_4 (excess) \longrightarrow$$
$$C_2H_5O-SO_2-O-SO_2-OC_2H_5 + (C_2H_5)_2SO_4$$

2.

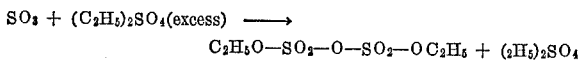

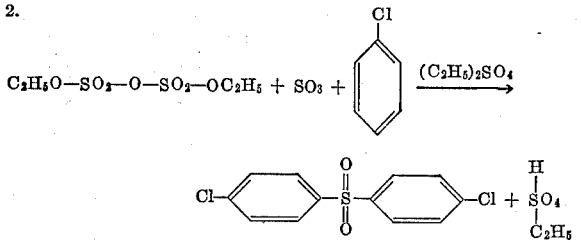

The overall preparation then can be shown by the equation

3.

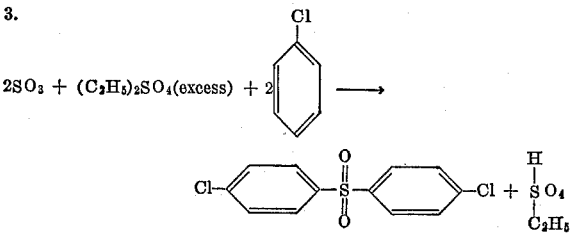

Generally about equimolar amounts of sulfur trioxide and chlorobenzene are employed in the present process, but this can be varied if desired. For example chlorobenzene can be used in 100 percent molar excess and higher. The calculation of molar excess of diethyl sulfate in the first stage of the process is based on the initial amount of sulfur trioxide employed.

The reactions of sulfur trioxide in Equations 1 and 2 above are exothermic and external cooling must be employed to maintain the temperature below the limits indicated otherwise exothermic decomposition of diethyl pyrosulfate occurs.

The following example is intended to illustrate this invention without limiting the same in any manner. All parts and percentages are by weight unless indicated otherwise.

One mole (80 g.) of stabilized sulfur trioxide (Sulfan) were added to 3 moles (462 g.) of diethyl sulfate while agitating and cooling to maintain the temperature below 10° C. Agitation was continued at this temperature for 3.5 hours to form a reaction mass containing unreacted diethyl sulfate and the reaction product of sulfur trioxide and diethyl sulfate. Four moles (450 g.) of chlorobenzene were added to the reaction mass accompanied by a 1° C. rise in temperature. A second mole (80 g.) of sulfur trioxide was added dropwise one and one-half hours with cooling to maintain the temperature below 15° C. The reaction mixture was diluted with an equal volume of dichloromethane and washed with water and a 10 percent solution of NaOH in water. The organic layer was dried over anhydrous magnesium sulfate and the diluent was evaporated. The excess diethyl sulfate was recovered by distillation in vacuo leaving a white residue which solidified on cooling. The residue was 222.4 g. representing a yield of 77.5 percent. Analysis by vapor phase chromatography indicated that the product was 98.9 percent 4,4'-dichlorodiphenyl sulfone.

For purposes of comparison, the above example is repeated using instead only one mole of diethyl sulfate. The yield of 4,4'-dichlorodiphenyl sulfone drops sharply to 50 percent.

We claim:
1. Process for preparing 4,4'-dichlorodiphenyl sulfone which comprises reacting sulfur trioxide and at least about 100 percent molar excess of diethyl sulfate at a temperature not greater than about 10° C. to form a reaction mass of diethyl sulfate and the reaction product of sulfur trioxide and diethyl sulfate, thereafter reacting said reaction mass with chlorobenzene and sulfur trioxide at a temperature not greater than about 15° C., and recovering 4,4'-dichlorodiphenylsulfone.

2. Process of claim 1 wherein said diethyl sulfate is present in an amount at least about 200 percent of molar excess.

3. Process of claim 1 wherein said sulfur trioxide and said chlorobenzene are employed in substantially equimolar amounts.

4. Process of claim 1 wherein said chlorobenzene is employed in about 100 percent molar excess.

5. Process for preparing 4,4'-dichlorodiphenyl sulfone which comprises reacting an equimolar amount of sulfur trioxide and at least about 200 percent molar excess of diethyl sulfate at a temperature not greater than about 10° C. to form a reaction mass of diethyl sulfate and the reaction product of sulfur trioxide and diethyl sulfate, thereafter reacting said reaction mass with about a 100 percent molar excess of chlorobenzene and an equimolar amount of sulfur trioxide at a temperature not greater than about 15° C., and recovering 4,4'-dichlorodiphenyl sulfone.

(References on following page)

References Cited

UNITED STATES PATENTS

| | | | |
|---|---|---|---|
| 3,052,708 | 9/1962 | Velluz et al. | 260—607 X |
| 2,971,985 | 2/1961 | Montmorency et al. | 206—607 X |
| 3,309,409 | 3/1967 | Steiger | 260—607 |
| 3,355,497 | 11/1967 | Budwick | 260—607 |

CHARLES B. PARKER, *Primary Examiner.*

D. R. PHILLIPS, *Assistant Examiner.*